United States Patent
Byrne

(10) Patent No.: US 11,520,898 B2
(45) Date of Patent: Dec. 6, 2022

(54) INTRUSION DETECTION

(71) Applicant: EMC IP Holding Company LLC, Hopkinton, MA (US)

(72) Inventor: Kenneth Byrne, Knockraha (IE)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 855 days.

(21) Appl. No.: 16/367,676

(22) Filed: Mar. 28, 2019

(65) Prior Publication Data

US 2020/0311280 A1 Oct. 1, 2020

(51) Int. Cl.
*G06F 21/57* (2013.01)
*G06F 21/55* (2013.01)
*G06F 3/06* (2006.01)
*G06F 21/62* (2013.01)
*G06N 20/00* (2019.01)

(52) U.S. Cl.
CPC .......... *G06F 21/577* (2013.01); *G06F 3/0604* (2013.01); *G06F 3/0647* (2013.01); *G06F 3/0683* (2013.01); *G06F 21/57* (2013.01); *G06F 21/6218* (2013.01); *G06N 20/00* (2019.01)

(58) Field of Classification Search
CPC .... G06F 3/0683; G06F 21/57; G06F 21/6218; G06F 21/554; G06F 3/0647; G06F 3/0604; G06F 21/577; G06F 3/0622; G06F 3/0659; G06N 20/20
See application file for complete search history.

(56) References Cited

U.S. PATENT DOCUMENTS

| | | | |
|---|---|---|---|
| 2008/0101378 A1* | 5/2008 | Krueger | H04L 47/11 370/395.52 |
| 2016/0021129 A1* | 1/2016 | Singh | G06F 21/562 726/23 |
| 2018/0007069 A1* | 1/2018 | Hunt | G06F 21/566 |
| 2018/0288063 A1* | 10/2018 | Koottayi | H04L 63/1416 |
| 2018/0373877 A1* | 12/2018 | Bruso | G06F 21/552 |
| 2020/0226292 A1* | 7/2020 | Feist | G06F 16/2379 |
| 2020/0280573 A1* | 9/2020 | Johnson | G06N 3/0454 |

FOREIGN PATENT DOCUMENTS

WO   WO-2016097757 A1 * 6/2016 ........... G06F 21/554

* cited by examiner

*Primary Examiner* — Joseph P Hirl
*Assistant Examiner* — Aayush Aryal
(74) *Attorney, Agent, or Firm* — Amin, Turocy & Watson, LLP

(57) ABSTRACT

Techniques are provided for intrusion detection on a computer system. In an example, a computer host device is configured to access data storage of the computer system via a communications network. It can be determined that the computer host device is behaving anomalously because a first current access by the computer host device to the data storage deviates from a second expected access by the computer host device to the data storage by more than a predefined amount. Then, in response to determining that the computer host device is behaving anomalously, the computer system can mitigate against the computer host device behaving anomalously.

20 Claims, 11 Drawing Sheets

INTRUSION DETECTION

TECHNICAL FIELD

The present application relates generally to techniques for identifying an intrusion in a computer network, and more specifically, for mitigating against an intrusion in a computer network.

BACKGROUND

A computer system, such as a data center, can provide access to resources, such as data storage, to one or more host computers that connect to the computer system via a communications network, such as the Internet. In some examples, a host computer can be used by a malicious actor to cause an intrusion—e.g., unauthorized access—to the computer system.

BRIEF DESCRIPTION OF THE DRAWINGS

Numerous aspects, embodiments, objects, and advantages of the present invention will be apparent upon consideration of the following detailed description, taken in conjunction with the accompanying drawings, in which like reference characters refer to like parts throughout, and in which.

DETAILED DESCRIPTION

Overview

Figure 1:
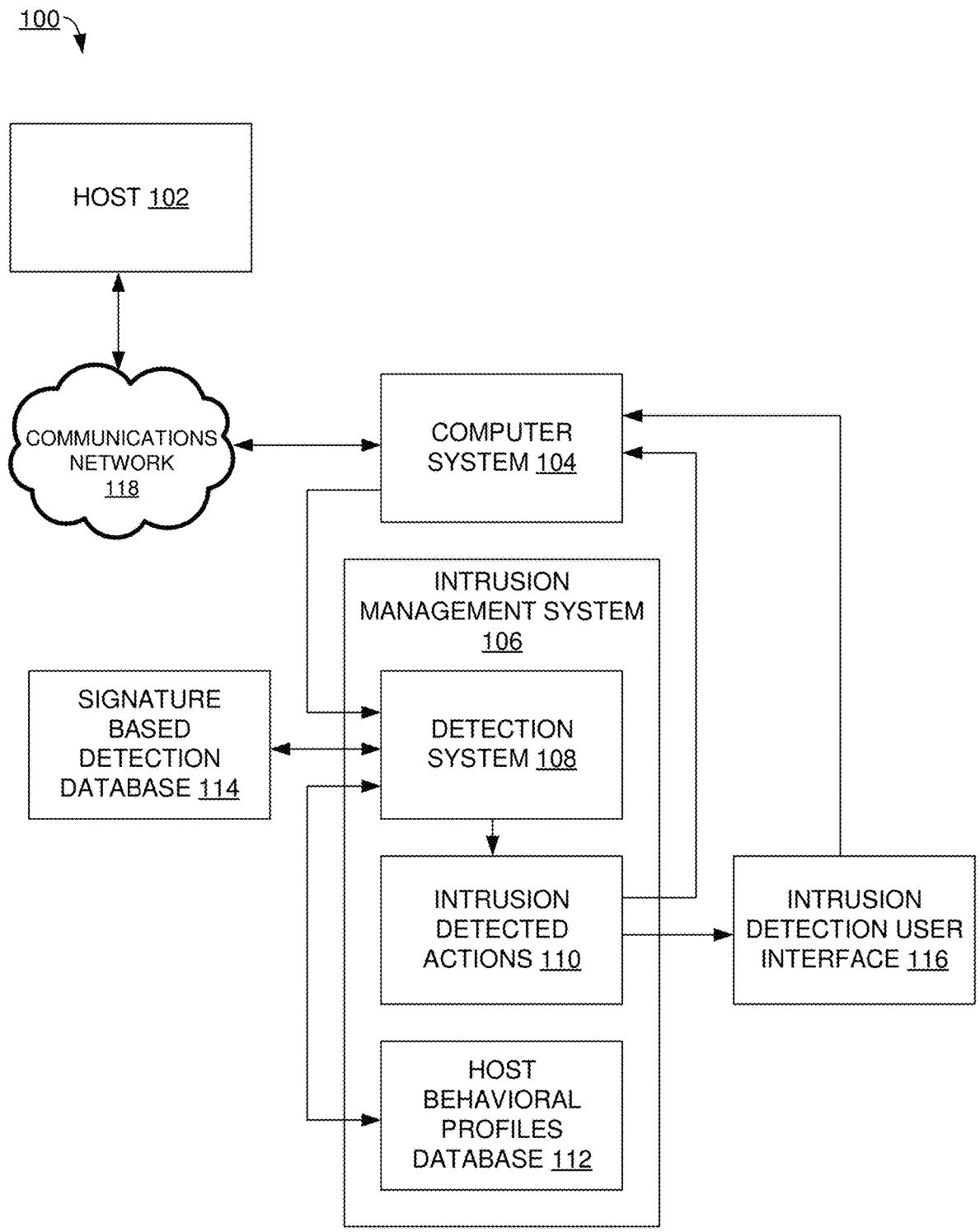
FIG. 1 illustrates a block diagram of an example computer system that can facilitate intrusion detection, in accordance with certain embodiments of this disclosure.

Data safety can be a concern for businesses and individuals that store information on remote storage, such as in a data center. A problem is that a data center administrator can have difficulty with predicting and detecting intrusions to a data center that can compromise stored data. In some examples, this difficulty can be particularly acute at the storage level. A data center administrator can monitor all aspects of a data life cycle to ensure that application owners are receiving the requested service level—e.g., response time, replication, etc.—but might have no way of knowing if the data center is currently under attack. It can take hours, days, or weeks before a data breach is discovered, and this delay—in addition to the attack itself—can be a major concern for data center providers.

There can be a problem with identifying an intrusion at the network level, which can involve inspecting packets, because doing so can consume a large amount of computing resources. There can also be a problem with identifying an intrusion at a host level, because this approach can be slow and permit a rogue host to siphon data for a great deal of time while appearing to behave normally. Then, a solution to this problem can be to identify intrusions at the storage level.

A solution to this problem can be to implement a two-part design comprising a detection system and a set of proactive intrusion-detection actions. In some examples, a detection system can comprise two parts. One part of a detection system can comprise a machine learning component that can capture a behavior profile of a host and cross-reference it against an expected profile for that time to detect anomalous behavior.

This behavior approach can use one or more host computers' metrics to study and learn the characteristics of each host over various time periods—e.g., an hour, a day, a week, a month, and a year—to create a robust behavior profile that can be stored and referenced against other host behavior to identify anomalous behavior.

This behaviour profile can be used to analyse and cross-reference a host's current characteristics against an expected profile for that time to determine the presence of anomalous behaviour. A system that implements a behaviour approach can continue to learn and adapt automatically to expected changes in a host's behaviour to ensure that a rogue event (e.g., 100% random reads from a device that should be doing no more than 60% random reads for that time period) is marked as anomalous behaviour.

A second part of a detection system can comprise a centrally-located database in a data center that stores known intrusion signatures, such as a Structured Query Language (SQL) injection, a Distributed Denial of Service (DDos) attack, and a Wannacry virus. Then, one or more intrusion management systems can look up using this database and cross-reference a host profile against known intruder profiles.

While discovering anomalous behaviour can be an effective technique for intrusion detection, in some examples, behaviour approaches might not uncover all types of attacks, such as when a rogue device has been connected to the computer system for a long time. To aid in intrusion detection, a signature-based approach can maintain a database of known intrusion techniques, such as SQL injection, Denial of Service (DDos), and Wannacry intrusion techniques.

Such a database can provide a lookup service for one or more intrusion management systems, which can allow the one or more intrusion management systems to check hosts connected to the computer system for attack signatures. A device profile of a host can be compared to a known attack profile that is stored in the database, and where a match is found, the host can be marked as a potential intruder.

In addition to providing this lookup service, such a database can accept suggestions of new attack characteristics dynamically. For example, where multiple intrusion detection systems suddenly report an attack with an unknown, but common, signature, this signature (once validated) can be added to the database so that other intrusion detection systems can search for this same attack approach in their environment, which can create an interconnected defense system.

Another aspect that can be implemented is a multi-level approach to autonomous proactive intrusion-detection actions, where a detection system can automatically react to the detected intrusion based on the selected level. With an autonomous system, there can be a clear definition of various levels of autonomy that lead to full control by a system, which can help a human user trust the system to perform the required tasks.

An example approach can include four such levels, as follows, which can be managed and updated through a set of APIs. A Level 0 approach can be a completely manual approach, where a system alerts an administrator of the intrusion, without taking further action. A Level 1 approach can involve the system automatically throttling one or more suspected world wide names (WWNs) using initiator bandwidth limits. A Level 2 approach can involve the system automatically quarantining all future write requests for a host, and suspending all read requests for the host. A Level 3 approach can involve the system automatically taking proactive actions based on a threat level, with the addition of suspending or terminating the host read and write requests (which can be achieved in some examples by modifying or deleting one or more masking views).

There are approaches for hardening a computer network (including computers on the network, and the buildings in which they reside) against malicious actors, but not at the storage level. Data can be encrypted at rest, which can provide some level of security for data that is not accessed often (e.g., archived data). However, in some examples, encrypting and decrypting frequently-accessed data can consume computing resources. Similarly, encryption can be applied between two computing devices, but using this encryption can affect processing time for both computing devices, and there is no guarantee that the computing device that is requesting data is not compromised.

Furthermore, it is becoming increasingly difficult to predict and detect intrusions, at least at the storage level. Data center administrators can monitor all aspects of the life cycle of data to ensure application owners are getting their requested service level (e.g., response time, replication, etc.), but they can have no way of knowing that they are under attack at that very minute.

In some examples, a computer system that implements these intrusion detection techniques can initially produce false positives, where the profiles of each host are unknown. To mitigate against this, an administrator of such a computer system can define aa set amount of time allocated to the system to learn each new host's profile. For example, if the main workload from a particular host bursts at the end of a month, then an administrator can define two-to-three months for the computer system to develop a good understanding of the host's behaviour. After this two-to-three month period has passed, then the computer system can perform a defined intrusion-detected action if a suspected intruder is uncovered.

In an example utilizing a DELL POWERMAX computer system, the system can ingest mi-trend files that are used by a sizer to configure a new computer system, so when the computer system is installed and switched on, the hosts are not completely unknown, and there can be a base profile for the computer system to work with.

In some examples, the following general approach to intrusion detection using both behaviour profiles and signature profile can be implemented. A particular host's current behaviour profile can be captured. This host's current behaviour profile can be compared against an expected behaviour profile for that host at the current time. The host's current signature can be compared to known attack signatures. Where either the behaviour profile or the intrusion signature indicates that the host is performing anomalous behaviour, then an appropriate mitigation action can be taken.

Example Architecture

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

FIG. 1 illustrates a block diagram of an example computer system 100 that can facilitate intrusion detection, in accordance with certain embodiments of this disclosure. Computer system 100 comprises host 102, computer system 104, intrusion management system 106 (which, in turn, comprises detection system 108, intrusion detected actions 110, and host behavioral profile database 112), signature-based detection database 114, intrusion detection user interface 116, and communications network 118.

Figure 11:
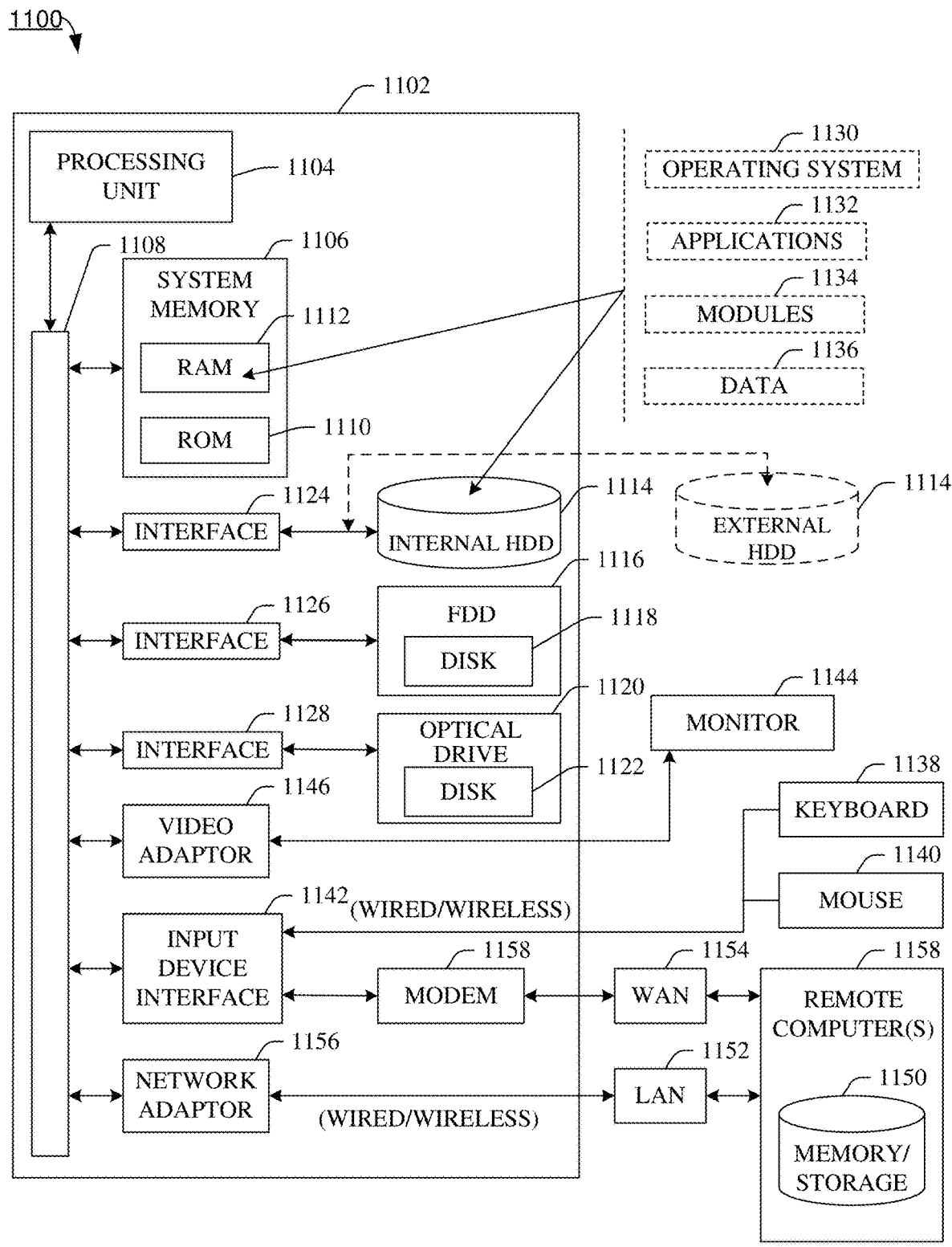
FIG. 11 illustrates an example block diagram of a computer operable to execute certain embodiments of this disclosure.

Each of host 102, computer system 104, intrusion management system 106, signature-based detection database 114, and intrusion detection user interface 116 can be implemented with aspects of one or more instances of computer 1102 of FIG. 11.

In an example, host 102 communicates with computer system 104 via communications network 118 to access storage resources provided by computer system 104. This access of storage resources can comprise reading data, writing data, and modifying data. In some examples, these storage resources are block-level storage, which provide network attached storage (NAS) that can be treated by a host like a hard drive that is locally attached to the host.

In the course of host 102 accessing the storage resources of computer system 104, host 102 can exhibit anomalous behavior that can be indicative of an intrusion. For example, expected behavior of host 102 at a particular time can be to read some data, where the reads are 40% sequential and 60% random. In this example, where instead host 102 reads much more data than is expected, and these reads are 100% sequential, this can be identified as anomalous behavior that can be indicative of an intrusion, where a malicious actor is utilizing host 102 to improperly access data stored by computer system 104.

Intrusion management system 106 can determine where host 102 exhibits anomalous behavior. In some examples, intrusion management system 106 can monitor computer system 104 for actions taken by host 102 regarding computer system 104. Detection system 108 of intrusion management system 106 can monitor the activity of host 102 for behavioral-based anomalies (by comparing host 102's current behavior against an expected behavior stored in host behavioral profiles database 112) and signature-based anomalies (by comparing host 102's current signature against known intrusion signatures stored in signature: based detection database 114). In this example, host behavioral profile database 112 is depicted as existing outside of intrusion management system 106, because it can be shared between multiple intrusion management systems.

Intrusion management system 106 can implement an application programming interface (API) that allow other computing systems to subscribe for alerts about anomalous behavior of particular hosts, and then receive those alerts.

Where detection system 108 determines that host 102 is behaving anomalously, detection system 108 can determine a remedial action from intrusion detected actions 110, which can comprise a stored set of predefined remedial actions to take against anomalous behavior (e.g., Level 0, Level 1, Level 2, or Level 3 remediation, as described herein), along with a component to implement the remedial action.

In some examples, implementing the remedial action can comprise intrusion detected actions 110 indicating to computer system 104 to perform a remedial action (e.g., terminate the connection with host 102). In other examples, implementing the remedial action can comprise intrusion detected actions 110 sending an indication of the anomaly and recommended remedial action to intrusion detection user interface 116. An administrator of computer system 100 can then manually evaluate the recommended remedial action, and, optionally, indicate to computer system 104 to implement the remedial action.

In some examples where intrusion detected actions 110 automatically implements a remedial action, an indication of this action can be sent to intrusion detection user interface 116 to inform an administrator of computer system 104.

In some examples where intrusion detected actions 110 automatically implements a remedial action, an indication of this action can be sent to intrusion detection user interface 112 to inform an administrator of computer system 102.

Example User Interfaces

Figure 2:
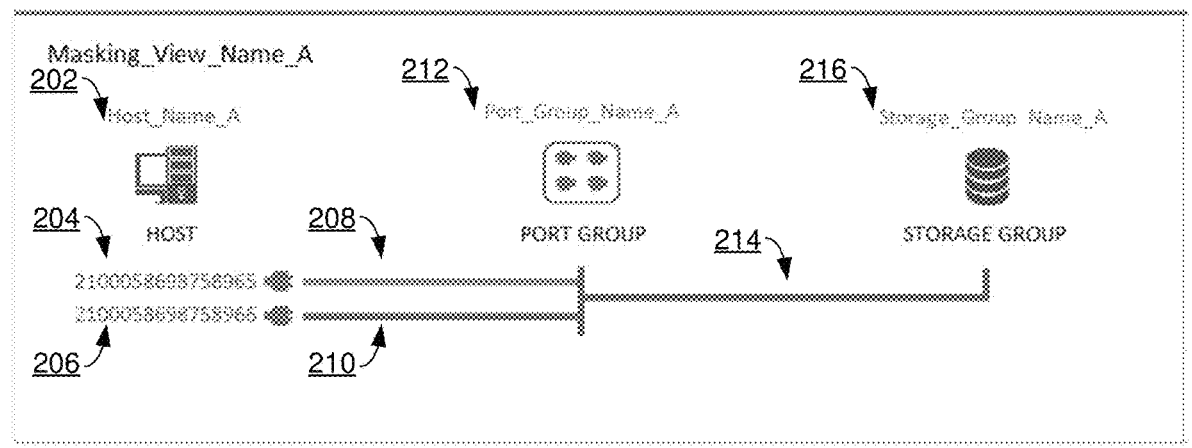
FIG. 2 illustrates an example user interface of an intrusion detection system, presenting a Level 0 mitigation, in accordance with certain embodiments of this disclosure.

FIG. 2 illustrates an example user interface 200 of an intrusion detection system, presenting a Level 0 mitigation, in accordance with certain embodiments of this disclosure. In some examples, user interface 200 can be displayed by intrusion detection user interface 116 of FIG. 1 to display information generated by intrusion management system 106.

Figure 3:
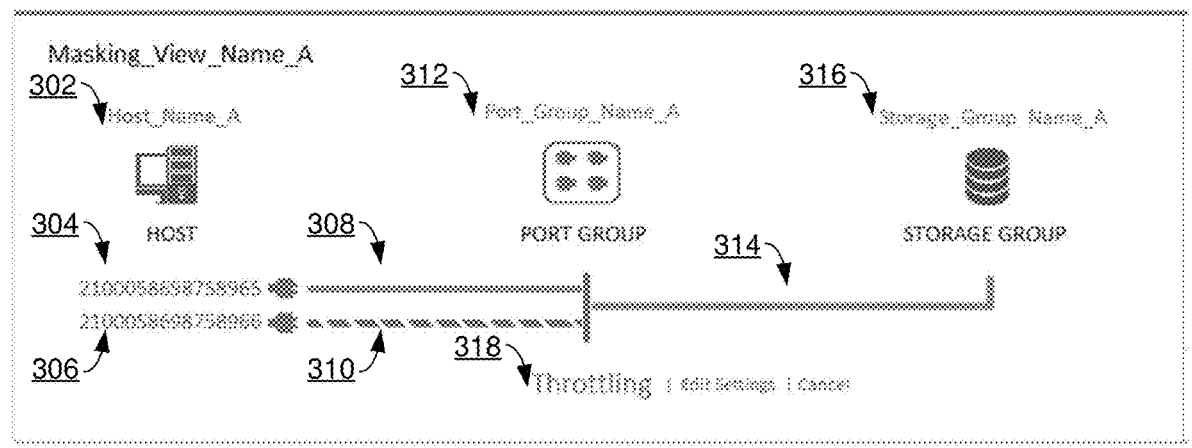
FIG. 3 illustrates an example user interface of an intrusion detection system, presenting a Level 1 mitigation, in accordance with certain embodiments of this disclosure.
Figure 4:
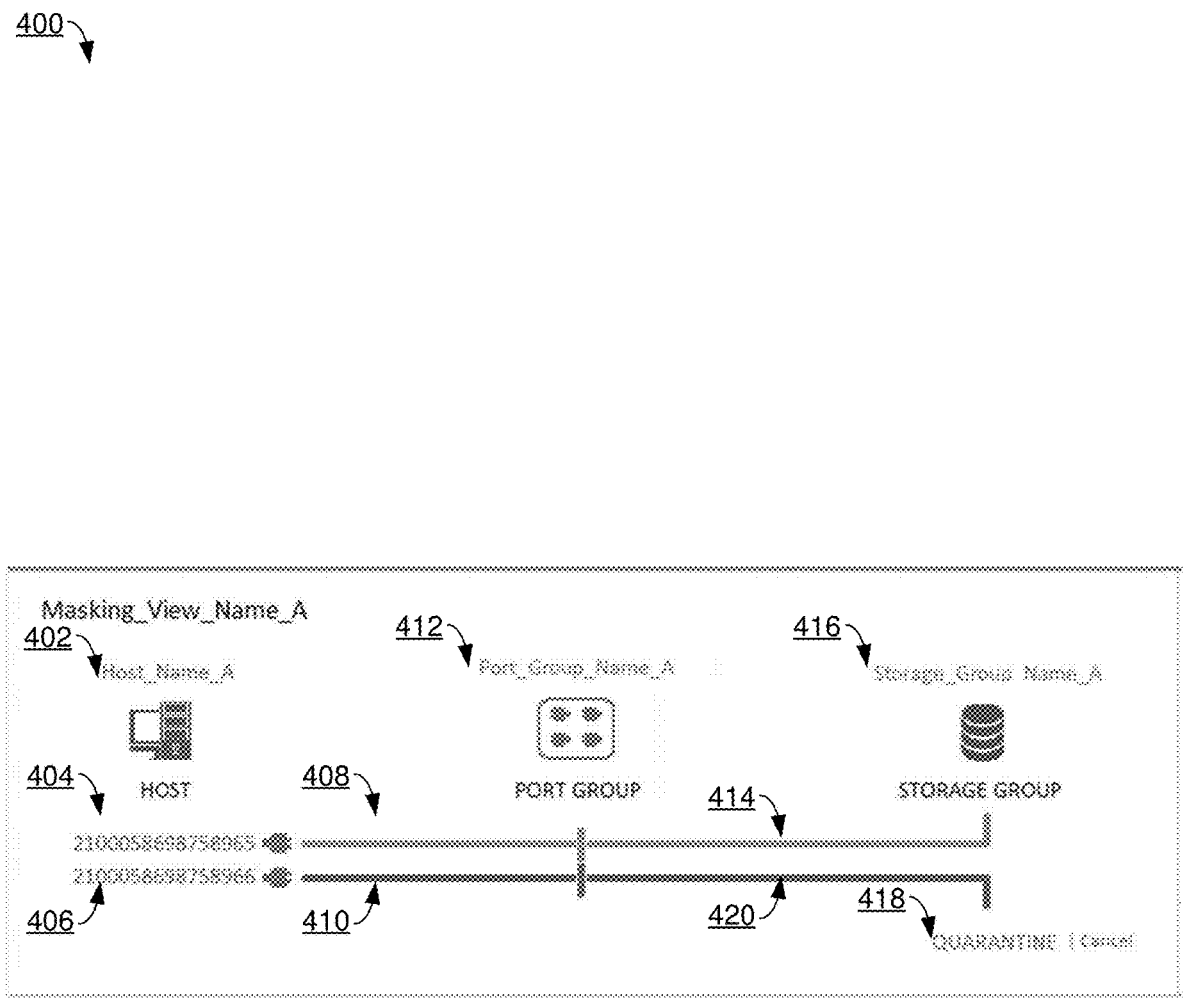
FIG. 4 illustrates an example user interface of an intrusion detection system, presenting a Level 2 mitigation, in accordance with certain embodiments of this disclosure.
Figure 5:
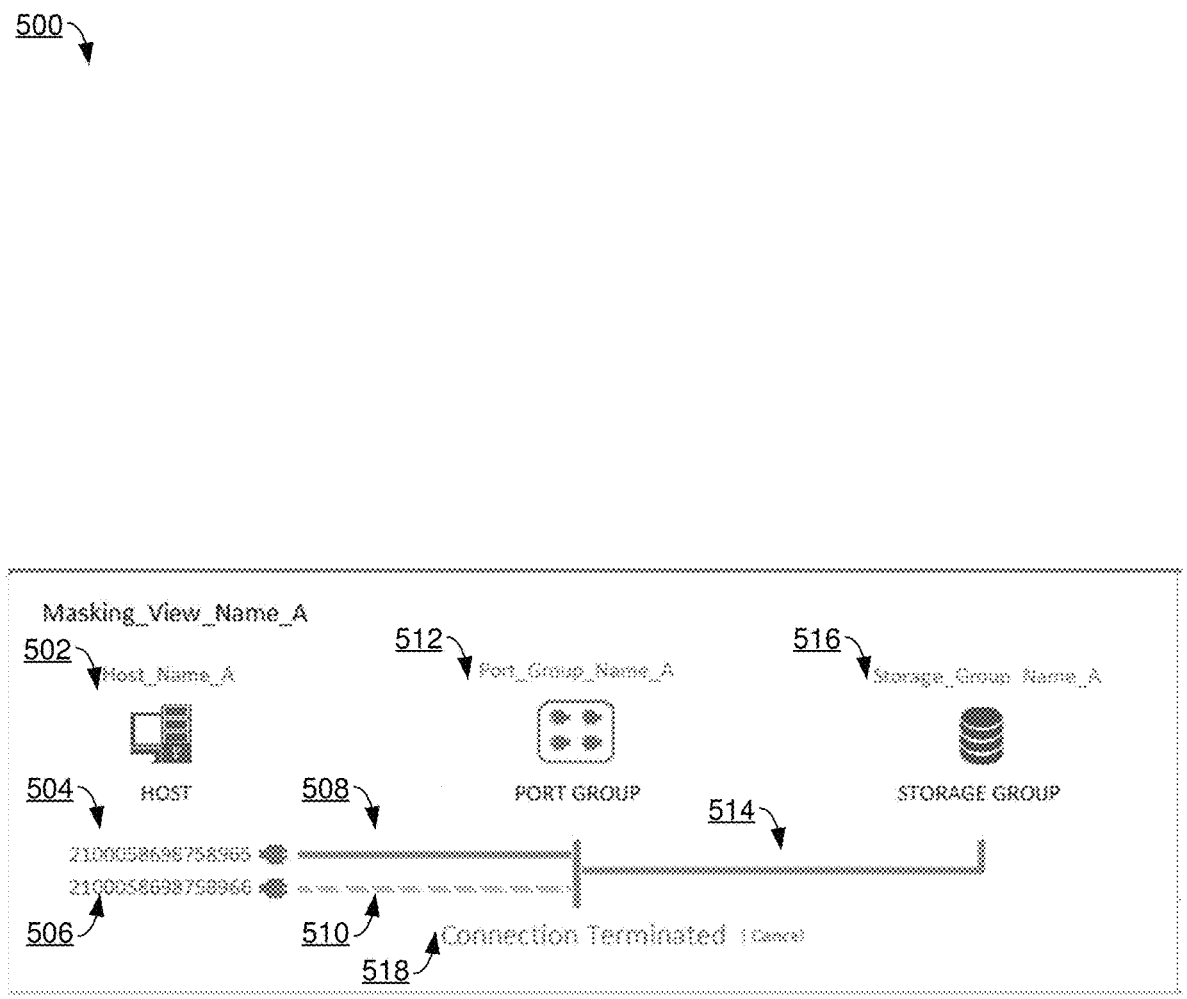
FIG. 5 illustrates an example user interface of an intrusion detection system, presenting a Level 3 mitigation, in accordance with certain embodiments of this disclosure.

The Level 0 mitigation of FIG. 2, as well as the Level 1-3 mitigations of FIGS. 3-5, respectively, can be example mitigations. It can be appreciated that there can be examples intrusion detection approaches that implement more or fewer types of mitigation, and different types of mitigation than are depicted here.

As depicted, user interface 200 conveys a Level 0 mitigation. In this example Level 0 mitigation, an indication of anomalous activity is depicted in user interface 200, but no automatic mitigation is implemented.

User interface 200 comprises host name 202, WWN 204, WWN 206, communications link 208, communications link 210, port group 212, communications link 214, and storage group 216. Host name 202 identifies a particular host that connects to the computer system (e.g., computer system 100 of FIG. 1) referenced by user interface 200. Port group 212 and storage group 216 identify a particular port group and a particular storage group, respectively, of the referenced computer system.

WWN 204 and WWN 206 each comprise a WWN of host name 202 that connects to port group 212. In other words, host name 202 can have multiple connections to port group 212. A WWN can comprise an 8- or 16-bit number that identifies an endpoint on a fiber-based communications network. In some examples, each WWN corresponds to a different virtual machine of host name 202.

As depicted, WWN 204 connects to port group 212 via communications link 208, and WWN 206 connects to port group 212 via communications link 210. Then port group 212 connects to storage group 216 via communications link 214.

In the example of FIG. 2, WWN 204 has not been associated with anomalous behavior, but WWN 206 has been associated with anomalous behavior. This anomalous behavior associated with WWN 206 can be identified in user interface 200 by having a different appearance between communications link 208 and communications link 210. For example, communications link 210 can be depicted as having a different color or a different line type than communications link 208. This visual depiction of anomalous behavior can be seen by an administrator who views user interface 200, who can then investigate the matter further.

FIG. 3 illustrates an example user interface 300 of an intrusion detection system, presenting a Level 1 mitigation, in accordance with certain embodiments of this disclosure. In some examples, user interface 300 can be displayed by intrusion detection user interface 116 of FIG. 1 to display information generated by intrusion management system 106.

The Level 1 mitigation of FIG. 3, as well as the Level 0 and 2-3 mitigations of FIGS. 2 and 4-5, respectively, can be example mitigations. It can be appreciated that there can be examples intrusion detection approaches that implement more or fewer types of mitigation, and different types of mitigation than are depicted here.

As depicted, user interface 300 conveys a Level 1 mitigation. In this example Level 1 mitigation, an indication of anomalous activity is depicted in user interface 300, and the host associated with the anomalous activity has its connection to the computer system throttled.

User interface 300 comprises host name 302, WWN 304, WWN 306, communications link 308, communications link 310, port group 312, communications link 314, storage group 316, and indication 318. Host name 302 identifies a particular host that connects to the computer system (e.g., computer system 100 of FIG. 1) referenced by user interface 300. Port group 312 and storage group 316 identify a particular port group and a particular storage group, respectively, of the referenced computer system.

WWN 304 and WWN 306 each comprise a WWN of host name 302 that connects to port group 312. In some examples, each WWN corresponds to a different virtual machine of host name 302.

As depicted, WWN 304 connects to port group 312 via communications link 308, and WWN 306 connects to port group 312 via communications link 310. Then port group 312 connects to storage group 316 via communications link 314.

In the example of FIG. 3, WWN 304 has not been associated with anomalous behavior, but WWN 306 has been associated with anomalous behavior. This anomalous behavior associated with WWN 306 can be identified in user interface 300 by having a different appearance between communications link 308 and communications link 310. For example, communications link 310 can be depicted as having a different color or a different line type than communications link 308. This visual depiction of anomalous behavior can be seen by an administrator who views user interface 300, who can then investigate the matter further. In some examples, where a line color or style is used in both user interface 200 of FIG. 2, and user interface 300, a different line color or style can be used in each of user interface 200 (which can indicate that anomalous behavior is detected) and user interface 300 (which can indicate both that anomalous behavior is detected, and that the host has its bandwidth throttled).

Throttling bandwidth for host name 302 can comprise reducing an amount of bandwidth available for host name 302 to access storage resources on a computer system (e.g., computer system 100 of FIG. 1). Indication 318 comprises a text indication that Level 1 mitigation is being implemented, and it reads "Throttling."

FIG. 4 illustrates an example user interface 400 of an intrusion detection system, presenting a Level 2 mitigation, in accordance with certain embodiments of this disclosure. In some examples, user interface 400 can be displayed by intrusion detection user interface 116 of FIG. 1 to display information generated by intrusion management system 106.

The Level 2 mitigation of FIG. 4, as well as the Level 0-1 and 3 mitigations of FIGS. 2-3 and 5, respectively, can be example mitigations. It can be appreciated that there can be examples intrusion detection approaches that implement more or fewer types of mitigation, and different types of mitigation than are depicted here.

As depicted, user interface 400 conveys a Level 2 mitigation. In this example Level 1 mitigation, an indication of anomalous activity is depicted in user interface 400, and the host associated with the anomalous activity has its connection to the computer system quarantined. In some examples, quarantining data, can comprise no new reads being permitted (until quarantine is lifted) and writes being queued rather than made to storage group 416.

User interface 400 comprises host name 402, WWN 404, WWN 406, communications link 408, communications link 410, port group 412, communications link 414, storage group 416, indication 418, and communications link 420. Host name 402 identifies a particular host that connects to the computer system (e.g., computer system 100 of FIG. 1) referenced by user interface 400. Port group 412 and storage group 416 identify a particular port group and a particular storage group, respectively, of the referenced computer system.

WWN 404 and WWN 406 each comprise a WWN of host name 402 that connects to port group 412. In some examples, each WWN corresponds to a different virtual machine of host name 402.

As depicted, WWN 404 connects to port group 412 via communications link 408, and then on to storage group 416 via communications link 414. WWN 406 connects to port group 412 via communications link 410, and then to a quarantine area (where writes are queued while under quarantine, rather than being made to storage group 416) via communications link 420.

In the example of FIG. 4, WWN 404 has not been associated with anomalous behavior, but WWN 406 has been associated with anomalous behavior. This anomalous behavior associated with WWN 406 can be identified in user interface 400 by having a different appearance between communications link 408 and communications link 410. For example, communications link 410 and communications link 420 can be depicted as having a different color or a different line type than communications link 408.

This visual depiction of anomalous behavior can be seen by an administrator who views user interface 400, who can then investigate the matter further. In some examples, where a line color or style is used in both user interface 200 of FIG. 2 (and/or user interface 300 of FIG. 3), and user interface 400, a different line color or style can be used in each user interface.

Indication 418 comprises a text indication that Level 2 mitigation is being implemented, and it reads "Quarantine."

FIG. 5 illustrates an example user interface 500 of an intrusion detection system, presenting a Level 3 mitigation, in accordance with certain embodiments of this disclosure. In some examples, user interface 500 can be displayed by intrusion detection user interface 116 of FIG. 1 to display information generated by intrusion management system 106.

The Level 3 mitigation of FIG. 5, as well as the Level 0-2 mitigations of FIGS. 2-4, respectively, can be example mitigations. It can be appreciated that there can be examples intrusion detection approaches that implement more or fewer types of mitigation, and different types of mitigation than are depicted here.

As depicted, user interface 500 conveys a Level 3 mitigation. In this example Level 3 mitigation, an indication of anomalous activity is depicted in user interface 500, and the host associated with the anomalous activity has its connection to the computer system terminated. In some examples, the connection can be terminated for a set amount of time. In some examples, the connection can be terminated by removing a masking view associated with the host.

User interface 500 comprises host name 502, WWN 504, WWN 506, communications link 508, communications link 510, port group 512, communications link 514, storage group 516, and indication 518. Host name 502 identifies a particular host that connects to the computer system (e.g., computer system 100 of FIG. 1) referenced by user interface 500. Port group 512 and storage group 516 identify a particular port group and a particular storage group, respectively, of the referenced computer system.

WWN 504 and WWN 506 each comprise a WWN of host name 502 that connects to port group 512. In some examples, each WWN corresponds to a different virtual machine of host name 502.

As depicted, WWN 504 connects to port group 512 via communications link 508, and WWN 506 connects to port group 512 via communications link 510. Then port group 512 connects to storage group 516 via communications link 514.

In the example of FIG. 5, WWN 504 has not been associated with anomalous behavior, but WWN 506 has been associated with anomalous behavior. This anomalous behavior associated with WWN 506 can be identified in user interface 500 by having a different appearance between communications link 508 and communications link 510. For example, communications link 510 can be depicted as having a different color or a different line type than communications link 508. This visual depiction of anomalous behavior can be seen by an administrator who views user interface 500, who can then investigate the matter further. In some examples, where a line color or style is used in user interface 200 of FIG. 2, user interface 300 of FIG. 3, user interface 400 of FIG. 4, and user interface 500, a different line color or style can be used in each user interface to indicate the different types of mitigation that are occurring in each user interface.

Terminating a connection with host name 502 can comprise preventing host name 502 from accessing storage resources on a computer system (e.g., computer system 100 of FIG. 1). Indication 518 comprises a text indication that Level 1 mitigation is being implemented, and it reads "Connection Terminated."

Figure 6:
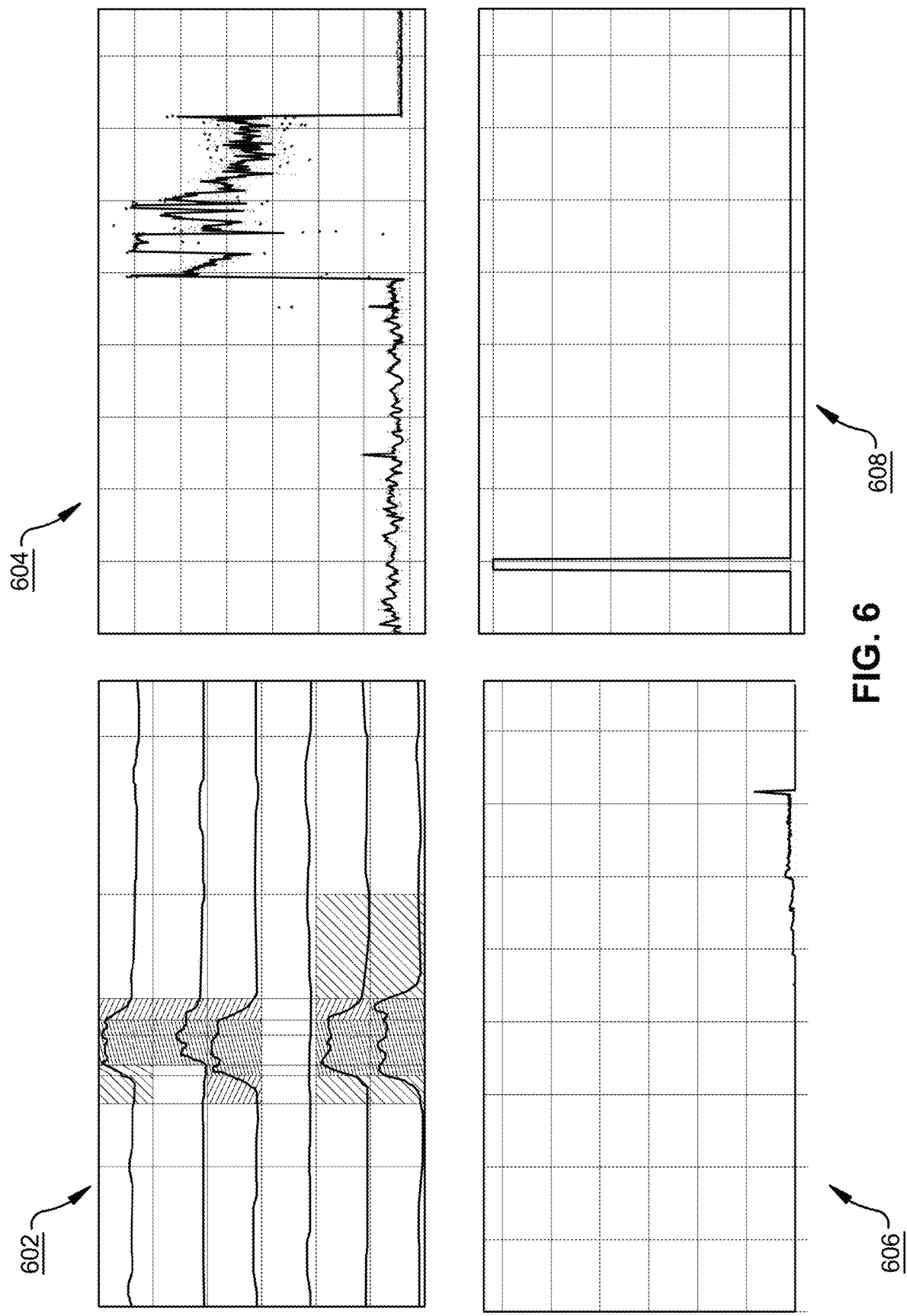
FIG. 6 illustrates an example user interface of an intrusion detection system, presenting more information, in accordance with certain embodiments of this disclosure.
Figure 7:
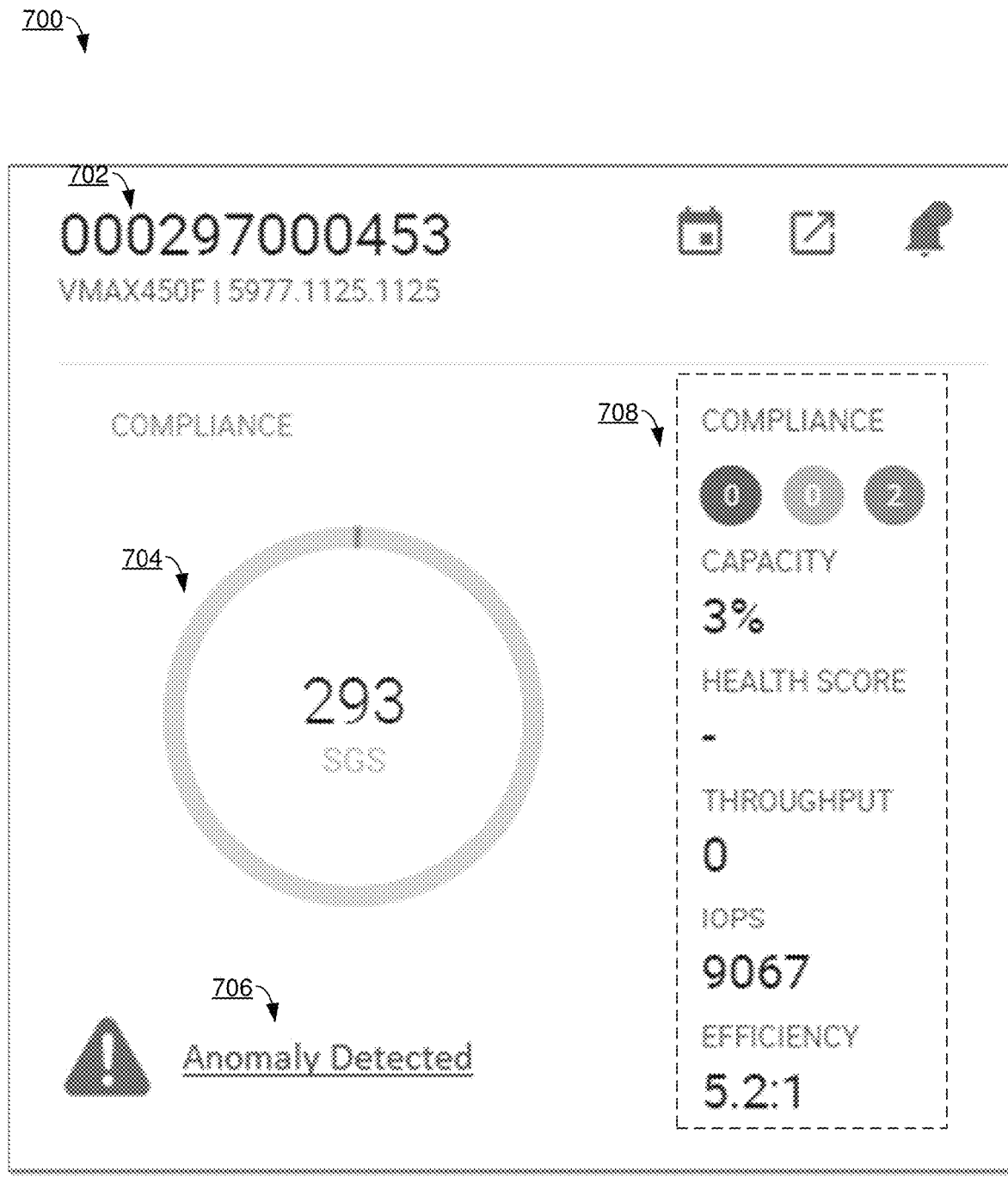
FIG. 7 illustrates an example user interface of an intrusion detection system, presenting a dashboard, in accordance with certain embodiments of this disclosure.

FIG. 6 illustrates an example user interface 600 of an intrusion detection system, presenting more information, in accordance with certain embodiments of this disclosure. In some examples, user interface 600 can be displayed by intrusion detection user interface 116 of FIG. 1 to display information generated by intrusion management system 106.

In some examples, user interface 600 can be accessed by a user who clicks on a user interface element present in user interface 200 of FIG. 2, user interface 300 of FIG. 3, user interface 400 of FIG. 4, and/or user interface 500 of FIG. 5. User interface 600 can provide more information about a detected anomaly, in addition to the information presented in user interface 200 of FIG. 2, user interface 300 of FIG. 3, user interface 400 of FIG. 4, and/or user interface 500 of FIG. 5.

User interface 600 comprises four graphs—graph 602, graph 604, graph 606, and graph 608—that each provide information about an anomaly. Graph 602 plots various metrics over time—host input/output (I/O) rate (e.g., IO/s), latency, a percentage of data accesses by the host that are writes, a percentage of data accesses by the host that are reads, aa percentage of data accesses by the host that access a cache, and a response time.

Example Process Flows

Figure 8:
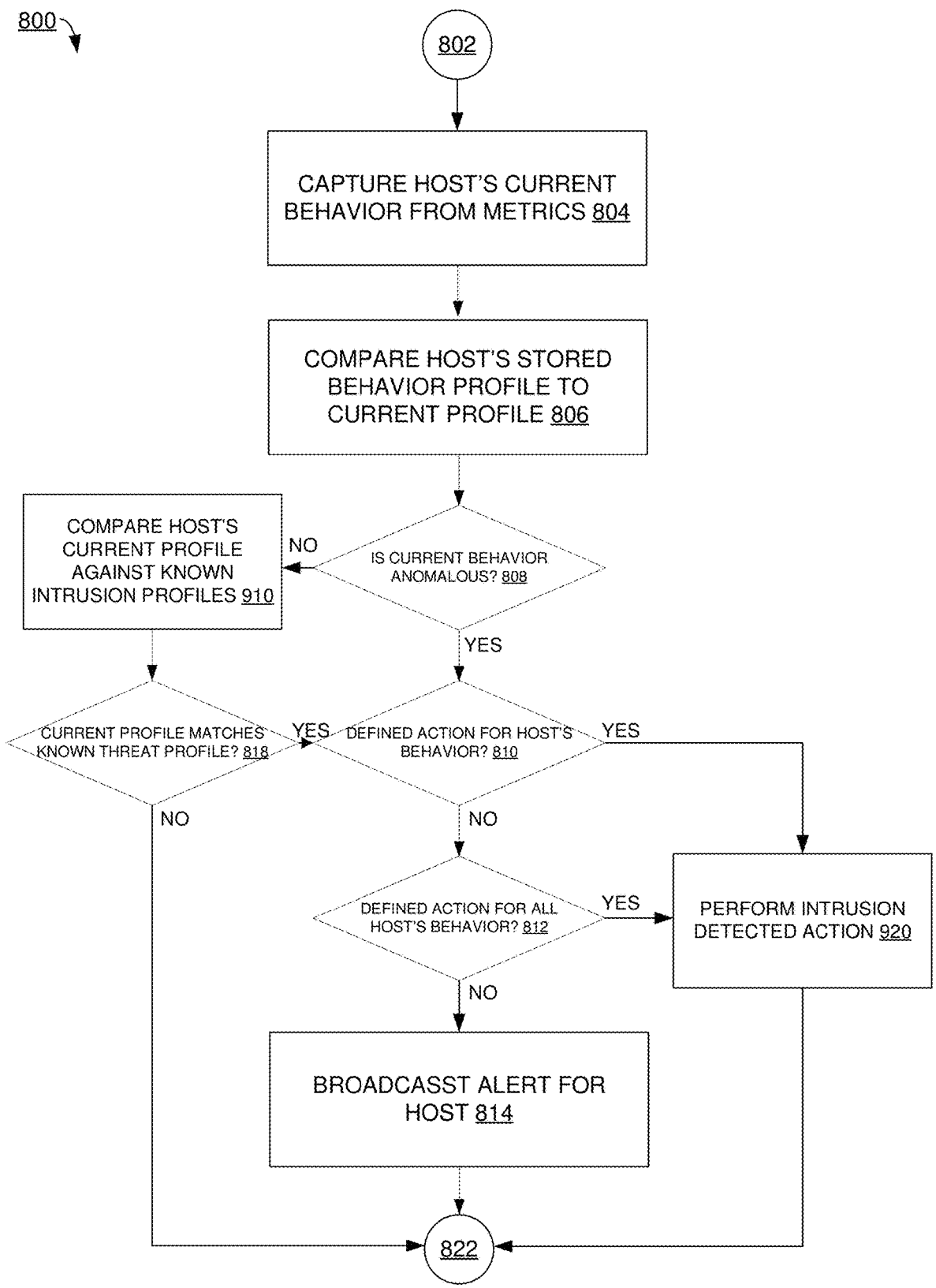
FIG. 8 illustrates an example process flow for intrusion detection, in accordance with certain embodiments of this disclosure.

FIG. 8 illustrates an example process flow 800 for intrusion detection, in accordance with certain embodiments of this disclosure. It can be appreciated that process flow 800 is an example process flow, and that there can be embodiments that implement more or fewer operations than are depicted in process flow 800, or that implement the operations of process flow 800 in a different order than is depicted in process flow 800.

In some embodiments, process flow 800 can be implemented with computer system 104, intrusion management system 106, signature-based detection database 114, and intrusion detection user interface 116 of FIG. 1. Process flow 800 begins with 802, and then moves to operation 804.

Operation 804 depicts capturing a host's current behavior from metrics. This can comprise intrusion management system 106 of FIG. 1 monitoring host 102 as it interacts with computer system 104 for its behavior. After operation 804, process flow 800 moves to operation 806.

Operation 806 depicts comparing the host's stored behavior profile to its current profile. The current profile can comprise the current behavior captured in operation 804. The stored behavior profile can be stored in host behavioral profiles database 112. After operation 806, process flow 800 moves to operation 808.

Operation 808 depicts determining if the current behavior is anomalous. The current behavior can be determined to be anomalous where it deviates from an expected behavior (based on the stored behavior profile) by more than a predetermined amount. Where it is determined in operation 808 that the current behavior is anomalous, process flow 800 moves to operation 810. Instead, where it is determined in operation 808 that the current behavior is not anomalous, process flow 800 moves to operation 816.

Operation 810 is reached from operation 808 where it is determined in operation 808 that the current behavior is anomalous, and from operation 818 where it is determined in operation 818 that the current profile matches a known threat profile. Operation 810 depicts determining whether there is a defined action for the current host's anomalous behavior. That is, action (or mitigation) for a particular anomalous behavior can be set on a per-host basis, and maintained by intrusion management system 106. Operation 810 can comprise determining whether an action for anomalous behavior has been specified for this specific host. Where it is determined in operation 810 that there is a defined action for the current host's anomalous behavior, process flow 800 moves to operation 820. Instead, where it is determined in operation 810 that there is not a defined action for the current host's anomalous behavior, process flow 800 moves to operation 812.

Operation 812 is reached from operation 810 where it is determined in operation 810 that there is not a defined action for the current host's anomalous behavior. Operation 812 depicts determining whether there are defined actions for all hosts' anomalous behavior. In addition to setting actions in response to anomalous behavior on a per-host basis, it can also be set more broadly—e.g., for multiple hosts within a particular group, or globally for all hosts. Where it is determined in operation 810 that there is not a host-specific action set for these circumstances, it can be determined in operation 812 whether the host is part of a group for which an action has been specified, and an indication of this can be maintained by intrusion management system 106.

Where it is determined in operation 812 that there are defined actions for all hosts' anomalous behavior, process flow 800 moves to operation 820. Instead, where it is determined in operation 812 that there are not defined actions for all hosts' anomalous behavior, process flow 800 moves to operation 814.

Operation 814 is reached from operation 812 where it is determined in operation 812 that there are not defined actions for all hosts' anomalous behavior. Operation 814 depicts broadcasting an alert for the host. That is, in some examples, where a specific action is not specified for a host's anomalous behavior, intrusion management system 106 can fallback to sending an alert, such as to a computer, or user interface for which an administrator of intrusion management system 106 has access. After operation 814, process flow 800 moves to 822, where process flow 800 ends.

Operation 816 is reached from operation 808 where it is determined in operation 808 that the current behavior is not anomalous. Operation 816 depicts comparing the host's current profile against known intrusion profiles. After operation 816, process flow 800 moves to operation 818.

Operation 818 depicts determining whether the current profile matches a known threat profile. In addition to the behavior-based detection described above, signature-based detection may also be implemented. Known threat profiles may be stored in signature-based detection database 114, and accessed here and compared against a signature of the host. Where they match within a predetermined level of similarly, it may be determined that they match. Where it is determined in operation 818 that the current profile matches a known threat profile, operation 818 moves to operation 810. Instead, where it is determined in operation 818 that the current profile does not match a known threat profile, operation 818 moves to 822, where process flow 800 ends.

Operation 820 is reached from operation 810 where it is determined that there is a defined action for the current host's anomalous behavior, and from operation 812 where it is determined that there are defined actions for all hosts' anomalous behavior. Operation 820 depicts performing the intrusion-detected action. This intrusion-detected action can comprise an action specified for the host itself, or for a group of which the host is a member, and in some examples can comprise Level 0 mitigation, Level 1 mitigation, Level 2 mitigation, and/or Level 3 mitigation. After operation 820, process flow 800 moves to 822, where process flow 800 ends.

Figure 9:
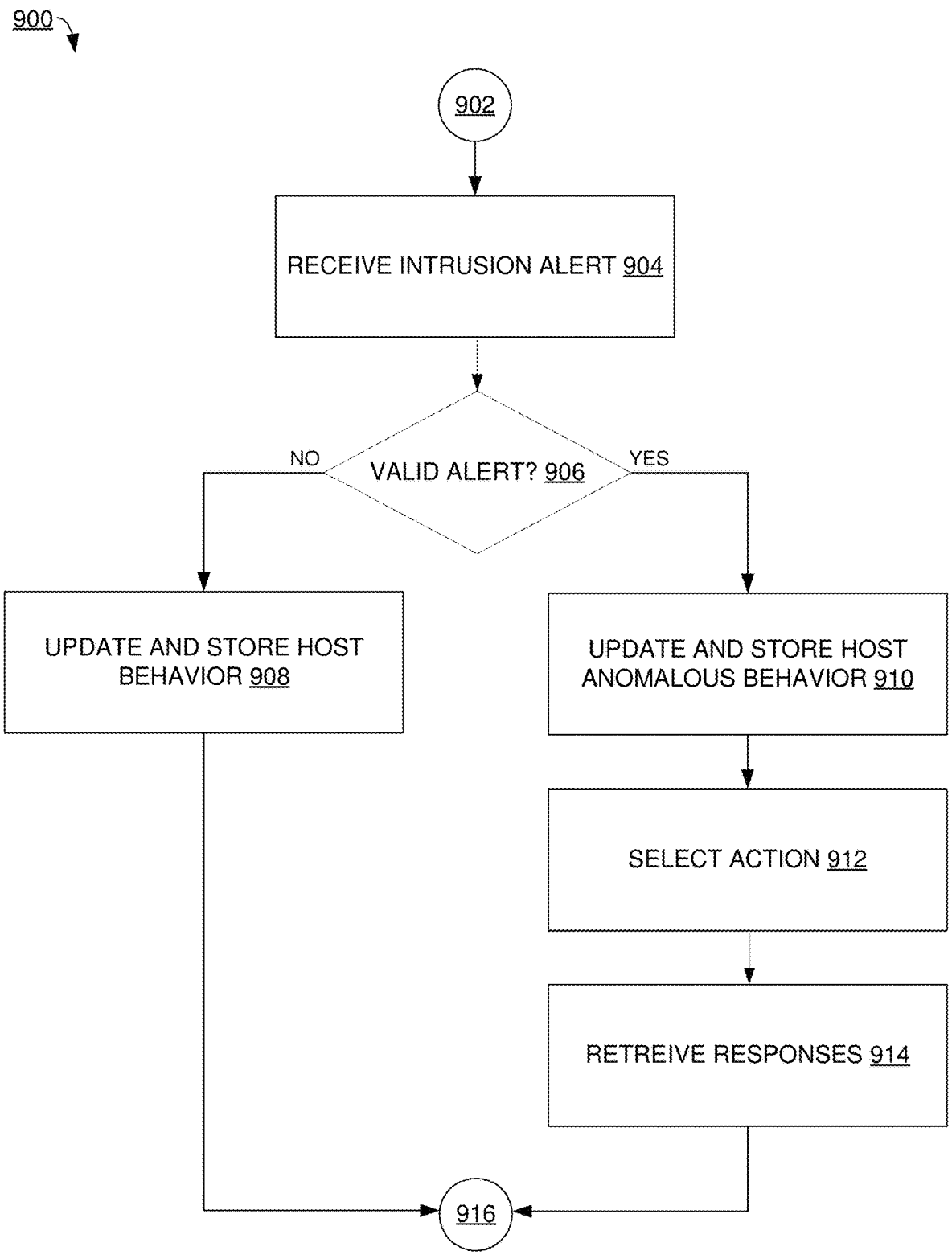
FIG. 9 illustrates an example process flow for implementing an action in response to an intrusion detection, in accordance with certain embodiments of this disclosure.

FIG. 9 illustrates an example process flow 900 for implementing an action in response to an intrusion detection, in accordance with certain embodiments of this disclosure. It can be appreciated that process flow 900 is an example process flow, and that there can be embodiments that implement more or fewer operations than are depicted in process flow 900, or that implement the operations of process flow 900 in a different order than is depicted in process flow 900.

In some embodiments, process flow 900 can be implemented with computer system 104, intrusion management system 106, signature-based detection database 114, and intrusion detection user interface 116 of FIG. 1. Process flow 900 begins with 902, and then moves to operation 904.

Operation 904 depicts receiving an alert for a host. An alert in operation 904 can comprise an indication that the host is behaving anomalously. After operation 904, process flow 900 moves to operation 906.

Operation 906 depicts determining whether the alert is valid. In some examples, determining whether the alert is valid can comprise receiving user input at a user interface from an administrator of intrusion management system 106 who has verified whether or not the alert is valid or is a false positive. Where it is determined in operation 906 that the alert is valid, then process flow 900 moves to operation 910. Instead, where it is determined in operation 906 that the alert is invalid, then process flow 900 moves to operation 908.

Operation 908 is reached from operation 906 where it is determined in operation 906 that the operation is invalid. Operation 908 depicts updating and storing host behavior. Where it is determined that there was a false positive, this information can be incorporated by intrusion management system 106 into a model of what constitutes the host's normal behavior. After operation 908, process flow 900 moves to 916, where process flow 900 ends.

Operation 910 is reached from operation 906 where it is determined in operation 906 that the operation is valid. Operation 910 depicts updating and storing host anomalous behavior. Where it is determined that the host is behaving anomalously, this information can be incorporated by intrusion management system 106 into a model of what constitutes the host's anomalous behavior. After operation 910, process flow 900 moves to operation 912.

Operation 912 depicts selecting an action. This action can comprise a mitigation against the host's anomalous behavior, and can comprise a Level 0, Level 1, Level 2, or Level 3 mitigation. In some examples, an action can be selected by intrusion management system 106 based on a predetermined set of rules for which types of mitigation correspond to which types of anomalous behavior. In other examples, an action can be selected based on receiving user input of such from an administrator of intrusion management system 106. After operation 912, process flow 900 moves to operation 914.

Operation 914 depicts implementing the action. This can be the action selected in operation 912, and can be implemented by intrusion management system 106. After operation 914, process flow 900 moves to 916, where process flow 900 ends.

Figure 10:
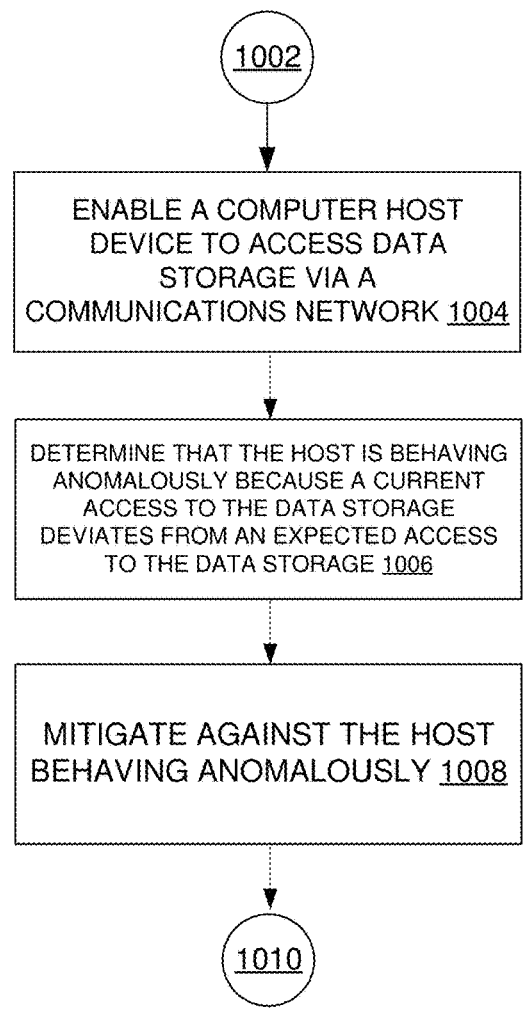
FIG. 10 illustrates another example process flow for intrusion detection, in accordance with certain embodiments of this disclosure.

FIG. 10 illustrates another example process flow 1000 for intrusion detection, in accordance with certain embodiments of this disclosure. It can be appreciated that process flow 1000 is an example process flow, and that there can be embodiments that implement more or fewer operations than are depicted in process flow 1000, or that implement the operations of process flow 1000 in a different order than is depicted in process flow 1000.

In some embodiments, process flow 1000 can be implemented with computer system 104, intrusion management system 106, signature-based detection database 114, and intrusion detection user interface 116 of FIG. 1. Process flow 1000 begins with 1002, and then moves to operation 1004.

Operation 1004 depicts enabling a computer host device to access data storage via a communications network. In some examples, operation 1004 comprises configuring a first computer host device with access to data storage via a communications network. In some examples, operation 1004 can be implemented by computer system 104 providing access to storage resources to host 102 via communications network 118. After operation 1004, process flow 1000 moves to operation 1006.

Operation 1006 depicts determining that the computer host device is behaving anomalously because a first current access by the computer host device to the data storage deviates from a second expected access by the computer host device to the data storage by more than a predefined amount. That is, operation 1006 can comprise implementing behavioral detection as described herein. In an example, intrusion management system 106 of FIG. 1 can store a second expected access by the computer host device (e.g., host 102) in host behavioral profiles database 112. Where the computer host device's current behavior, which can be a first current access, deviates from this second expected access more than a predefined amount, then the computer host device can be determined to be behaving anomalously.

In some examples, the first current access by the computer host device to the data storage the first current access by the computer host device to the data storage comprises at least one from a set, the set comprising a rate of sequential reads or writes, a rate of random reads or writes, a total number of sequential reads or writes, a total number of random reads or writes, a percentage of reads or writes that are sequential, and a percentage of reads or writes that are random. These types of access can generally be considered to be storage level accesses, because they relate to how data is being accessed as it is stored (e.g., where the accessed data is stored, which can be from sequential virtual or physical locations, or random virtual or physical locations).

In some examples, operation 1006 comprises determining that the computer host device is behaving anomalously based on the first current access by the computer host device to the data storage matches a first known attack signature. That is, a signature-based approach can be incorporated in detecting anomalous behavior. For example, intrusion management system 106 of FIG. 1 can compare a signature of a computer host device (e.g., host 102) against signatures stored in signature-based detection database 114. Where the computer host device's signature matches a signature for anomalous behavior in signature-based detection database 114 within a predetermined amount, then this can be the basis for determining that the computer host device is behaving anomalously.

In some examples, operation 1006 comprises determining the first known attack signature based on a second signature of a second computer host device and a third signature of a third computer host device that exhibit anomalous access to the data storage. That is, attack signatures can be identified by observing hosts with unknown, but common, signatures that are attacking.

In some examples, operation 1006 comprises determining the second expected access by the computer host device to the data storage based on past behavior of the computer host device. That is, a computer host device's expected behavior can be learned based on its own prior behavior.

In some examples, the second expected access by the computer host device to the data storage is based on a current time. That is, what is determined to be anomalous behavior may vary based on a time period in which it occurs. For example, a particular computer host device may exhibit normal behavior comprising a relatively small amount of data access for most of the month, with a spike in data access at the end of a month when a report is generated. In this scenario, a spike in data access at the end of the month may be determined not to be anomalous behavior, while that same spike in data access in the middle of a month may be determined to be anomalous behavior.

In some examples, the computer host device is a first computer host device, and the second expected access by the first computer host device is determined based on a third access by a second computer host device to the data storage. That is, in some examples, an expected behavior for a particular computer host device can be determined based on the behavior of multiple computer host devices, rather than solely the computer host device being evaluated.

In some examples, operation 1006 comprises performing machine learning on a third previous access by the computer host device to the data storage to determine the second expected access by the computer host device to the data storage. That is, machine learning can be implemented to determine expected behavior for a particular computer host device.

After operation 1006, process flow 1000 moves to operation 1008.

Operation 1008 depicts, in response to determining that the computer host device is behaving anomalously, mitigating against the computer host device behaving anomalously. In some examples, operation 1008 comprises mitigating against the computer host device behaving anomalously. In some examples, this mitigation against the computer host device behaving anomalously can comprise implementing Level 0, Level 1, Level 2, and/or Level 3 mitigation, as described herein.

In some examples, mitigating against the computer host device behaving anomalously comprises sending an alert to an administrator of the system. That is, the mitigation can comprise a Level 0 alert.

In some examples, mitigating against the computer host device behaving anomalously comprises throttling a bandwidth of data available to the computer host device to access the data storage. That is, the mitigation can comprise a Level 1 throttling of bandwidth for the computer host device that is behaving anomalously.

In some examples, mitigating against the computer host device behaving anomalously comprises quarantining a write request from the computer host device to the data storage. That is, the mitigation can comprise a Level 2 quarantining of writes to the system by the computer host device.

In some examples, operation 1008 comprises, after quarantining the write request, and in response to determining that the computer host device is permitted to make the write request, effectuating the write request on the data storage. That is, after beginning to quarantine writes, it can be determined that there was a false-positive in determining that the computer host device is behaving anomalously. In response to determining that there was a false-positive, then writes can then be moved from being quarantined to being effectuated on storage resources of the system. For example, the data to be written can be queued in an area separate from the regular storage area of the system, and can then be written from that area to the regular storage area of the system.

In some examples, mitigating against the computer host device behaving anomalously comprises suspending a permission of the computer host device to read data from the data storage. That is, the mitigation can comprise a Level 2 suspension of reads from the system by the computer host device.

In some examples, mitigating against the computer host device behaving anomalously comprises terminating a communications link between the computer host device and the system. That is, the mitigation can comprise a Level 3 termination of the host's connection to the system.

In some examples, the computer host device is a first computer host device, and operation 1008 comprises implementing, by the system, a first learning period for a second computer host device upon initially communicating with the system during which anomalous behavior by the second computer host device does not result in mitigation. That is, when the second computer host device initially connects to the system, the system may implement a learning period for a predetermined amount of time, where the second computer host device's behavior is learned. In some examples, the second computer host device can then be determined to be behaving anomalously after this learning period expires.

In some examples, operation 1008 comprises, in response to determining that the computer host device continues to behave anomalously after a predefined time period, modifying, by the system, the mitigation against the computer host device behaving anomalously. That is, the type of mitigation can be escalated (or de-escalated). In some examples, the mitigation can be escalated (e.g., escalated from Level 0 mitigation to Level 1 mitigation) where the computer host device continues to behave anomalously for a predetermined amount of time after Level 0 mitigation is implemented. In other examples, escalation can be implemented where there has not been manual intervention by a system administrator for a predetermined amount of time.

For example, where Level 0 mitigation is implemented, and then a system administrator does not view the alert and either remedy the situation, or mark it as a false positive, for a predetermined amount of time, then the system can escalate the mitigation to Level 1. In another example, where a set number of Level 0 alerts (e.g., 10 alerts) are made and there is no intervention by an administrator of intrusion management system 106, then the mitigation can be escalated to Level 1.

In some examples, operation 1008 comprises, after the mitigating, determining, by the system that the computer host device was not behaving anomalously, and updating the second expected access by the computer host device based on the determining that the computer host device was not behaving anomalously. That is, an expected behavior of a particular computer host device can be updated where it is determined that there has been a false positive for anomalous behavior.

In some examples, the mitigating is performed at an initiator group of the system. That is, the mitigation (e.g., throttling, quarantining, terminating) can be effectuated at an initiator group. An initiator group can be a setting of the system that indicates whether a computer host device can access a particular part of the system's storage (sometimes referred to as a logical unit number (LUN)), and, in some examples, can specify quality of service aspects of that access, such as bandwidth (which can be throttled). In some examples, a system can perform these actions at a per-WWN level at an initiator group. After operation 1008, process flow 1000 moves to 1010, where process flow 1000 ends.

Example Operating Environment

To provide further context for various aspects of the subject specification, FIG. 11 illustrates a block diagram of a computer 1102 operable to execute the disclosed storage architecture in accordance with aspects described herein. For example, aspects of computer 1102 can be used to implement host 102, computer system 104, intrusion management system 106, signature-based detection database 114, and intrusion detection user interface 116 of FIG. 1. In some examples, computer 1102 can implement aspects of the operating procedures of FIGS. 8-10 to provide for intrusion detection.

FIG. 11 illustrates a block diagram of a computer 1102 operable to execute the disclosed communication architecture. To provide additional context for various aspects of the disclosed subject matter, FIG. 11 and the following discussion are intended to provide a brief, general description of a suitable computing environment 1100 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices. The illustrated aspects of the specification can also be practiced in distributed computing environments where certain tasks are performed by remote processing devices that are linked through a communications network. In a distributed computing environment, program modules can be located in both local and remote memory storage devices.

Computing devices can include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, random access memory (RAM), read-only memory (ROM), electrically erasable programmable read-only memory (EEPROM), flash memory or other memory technology, compact disc read only memory (CD-ROM), digital versatile disc (DVD; sometimes referred to as digital video disc) or other optical disc storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals can refer to a signal that has one or more of its characteristics set or changed in such a manner as to encode information in one or more signals. By way of example, and not limitation, communication media include wired media, such as a wired network or direct-wired connection, and wireless media such as acoustic, radio frequency (RF), infrared and other wireless media.

With reference again to FIG. 11, the example environment 1100 for implementing various aspects of the specification includes a computer 1102, the computer 1102 including a processing unit 1104, a system memory 1106 and a system bus 1108. As an example, the component(s), server(s), node(s), cluster(s), system(s), and/or device(s) disclosed herein can each include at least a portion of the computer 1102. The system bus 1108 can couple system components including, but not limited to, the system memory 1106 to the processing unit 1104. The processing unit 1104 can be any of various commercially-available or custom processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 can include ROM 1110 and RAM 1112. A basic input/output system (BIOS) can be stored in a non-volatile memory 1110 such as ROM, erasable programmable read-only memory (EPROM), EEPROM, where the BIOS can contain the basic routines that help to transfer information between elements within the computer 1102, such as during startup. The RAM 1112 can also include a high-speed RAM such as static RAM for caching data, or NVRAM.

The computer 1102 further includes an internal hard disk drive (HDD) 1114, which internal hard disk drive 1114 can also be configured for external use in a suitable chassis (not shown), a magnetic floppy disk drive (FDD) 1116, (e.g., to read from or write to a removable diskette 1118) and an optical disc drive 1120, (e.g., reading a CD-ROM disc 1122 or, to read from or write to other high capacity optical media such as the DVD). The hard disk drive 1114, magnetic disk drive 1116 and optical disc drive 1120 can be connected to the system bus 1108 by a hard disk drive interface 1124, a magnetic disk drive interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the subject disclosure.

The drives and their associated computer-readable storage media can provide nonvolatile storage of data, data structures, computer-executable instructions, and so forth. For the computer 1102, the drives and storage media can accommodate the storage of any data in a suitable digital format. Although the description of computer-readable storage media above refers to a HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods of the specification.

Many program modules can be stored in the drives and RAM 1112, including an operating system 1130, one or more application programs 1132, other program modules 1134 and program data 1136. All or portions of the operating system, applications, modules, and/or data can also be cached in the RAM 1112. It is appreciated that the specification can be implemented with various commercially available operating systems or combinations of operating systems.

A user can enter commands and information into the computer 1102 through one or more wired or wireless input devices, e.g., a keyboard 1138 and/or a pointing device, such as a mouse 1140 or a touch screen or touchpad (not illustrated). These and other input devices can be connected to the processing unit 1104 through an input device interface 1142 that is coupled to the system bus 1108, but can be connected by other interfaces, such as a parallel port, an IEEE 1194 port, a game port, a USB port, an infrared (IR) interface, etc. A monitor 1144 or other type of display device can also be connected to the system bus 1108 via an interface, such as a video adapter 1146.

The computer 1102 can operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and can include many or all the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments can be commonplace in offices and companies, and facilitate enterprise-wide computer networks, such as intranets, all of which can connect to a global communications network, e.g., the Internet.

When used in a LAN networking environment, the computer 1102 is connected to the local network 1152 through a wired and/or wireless communication network interface or adapter 1156. The adapter 1156 can facilitate wired or wireless communication to the LAN 1152, which can also include a wireless access point disposed thereon for communicating with the wireless adapter 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, can be connected to the system bus 1108 via the serial port interface 1142. In a networked environment, program modules depicted relative to the computer 1102, or portions thereof, can be stored in the remote memory/storage device 1150. It will be appreciated that the network connections shown are example and other means of establishing a communications link between the computers can be used.

The computer 1102 can be operable to communicate with any wireless devices or entities operatively disposed in wireless communication, e.g., desktop and/or portable computer, server, communications satellite, etc. This includes at least Wireless Fidelity (Wi-Fi) and BLUETOOTH wireless technologies. Thus, the communication can be a predefined structure as with a conventional network or simply an ad hoc communication between at least two devices.

Wi-Fi can allow a connection to the Internet from a couch at home, a bed in a hotel room, or a conference room at work, without wires. Wi-Fi can be a wireless technology similar to that used in a cell phone that enables such devices, e.g., computers, to send and receive data indoors and out; anywhere within the range of a base station. Wi-Fi networks can use radio technologies called IEEE 802.11 (a, b, g, n, etc.) to provide secure, reliable, fast wireless connectivity. A Wi-Fi network can be used to connect computers to each other, to the Internet, and to wired networks (which can use an IEEE 802.3 standard or Ethernet). Wi-Fi networks can operate in the unlicensed 5 GHz radio band at a 54 Mbps (802.11a) data rate, and/or a 2.4 GHz radio band at an 11 Mbps (802.11b), a 54 Mbps (802.11g) data rate, or up to a 600 Mbps (802.11n) data rate for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
enabling a first computer host device to access data storage via a communications network;
determining that the first computer host device is behaving anomalously because a first current access by the first computer host device to the data storage deviates from a second expected access by the first computer host device to the data storage by more than a predefined amount, wherein the second expected access is determined based on a third access by a second computer host device to the data storage; and
in response to determining that the first computer host device is behaving anomalously, mitigating against the first computer host device behaving anomalously.

2. The system of claim 1, wherein the first current access by the first computer host device to the data storage comprises at least one from a set, the set comprising a rate of sequential reads or writes, a rate of random reads or writes, a total number of sequential reads or writes, a total number of random reads or writes, a percentage of reads or writes that are sequential, and a percentage of reads or writes that are random.

3. The system of claim 1, wherein the mitigating against the first computer host device behaving anomalously comprises:
sending an alert to an administrator of the system.

4. The system of claim 1, wherein the mitigating against the first computer host device behaving anomalously comprises:
throttling a bandwidth of data available to the first computer host device to access the data storage.

5. The system of claim 1, wherein the mitigating against the first computer host device behaving anomalously comprises:
quarantining a write request from the first computer host device to the data storage.

6. The system of claim 5, wherein the operations further comprise:
after quarantining the write request, and in response to determining that the first computer host device is permitted to make the write request, effectuating the write request on the data storage.

7. The system of claim 1, wherein the mitigating against the first computer host device behaving anomalously comprises:

suspending a permission of the first computer host device to read data from the data storage.

8. A method, comprising:
configuring, by a system comprising a processor, a computer host device with access to data storage via a communications network;
determining, by the system, that the first computer host device is behaving anomalously because a first current access by the first computer host device to the data storage deviates from a second expected access by the first computer host device to the data storage by more than a predefined amount, wherein the second expected access is determined based on a third access by a second computer host device to the data storage; and
mitigating, by the system, against the first computer host device behaving anomalously.

9. The method of claim 8, wherein the mitigating against the first computer host device behaving anomalously comprises:
terminating a communications link between the first computer host device and the system.

10. The method of claim 8, wherein the determining that the first computer host device is behaving anomalously further comprises:
determining, by the system, that the first computer host device is behaving anomalously based on the first current access by the first computer host device to the data storage matches a first known attack signature.

11. The method of claim 10, further comprising:
determining the first known attack signature based on respective signatures of respective computer host devices that are separate from the first computer host device and the second computer host device, and that exhibit anomalous access to the data storage.

12. The method of claim 8, further comprising:
implementing, by the system, a first learning period for a third computer host device upon initially communicating with the system during which anomalous behavior by the third computer host device does not result in mitigation.

13. The method of claim 8, further comprising:
determining, by the system, the second expected access by the first computer host device to the data storage based on past behavior of the first computer host device.

14. The method of claim 8, further comprising:
in response to determining that the first computer host device continues to behave anomalously after a predefined time period, modifying, by the system, the mitigation against the first computer host device behaving anomalously.

15. A non-transitory computer-readable medium comprising instructions that, in response to execution, cause a system comprising a processor to perform operations, comprising:
determining that a first computer host device is behaving anomalously because a first current access by the first computer host device to a data storage deviates from a second expected access by the first computer host device to the data storage by more than a predefined amount, wherein the second expected access is determined based on a third access by a second computer host device to the data storage; and
mitigating against the first computer host device behaving anomalously.

16. The non-transitory computer-readable medium of claim 15, wherein the second expected access by the first computer host device to the data storage is based on a current time.

17. The non-transitory computer-readable medium of claim 15, wherein the operations further comprise:
after the mitigating, determining, by the system that the first computer host device was not behaving anomalously; and
updating the second expected access by the first computer host device based on the determining that the first computer host device was not behaving anomalously.

18. The non-transitory computer-readable medium of claim 15, wherein the determining that the computer host device is behaving anomalously comprises:
performing machine learning on a third previous access by the first computer host device to the data storage to determine the second expected access by the first computer host device to the data storage.

19. The non-transitory computer-readable medium of claim 15, wherein the mitigating is performed at an initiator group of the system.

20. The non-transitory computer-readable medium of claim 15, wherein the operations further comprise:
determining the first known attack signature based on respective signatures of respective computer host devices that are separate from the first computer host device and the second computer host device, and that exhibit anomalous access to the data storage.

* * * * *